(12) United States Patent
Cochran et al.

(10) Patent No.: US 12,127,506 B2
(45) Date of Patent: Oct. 29, 2024

(54) TRANSPORTING AND PROCESSING LARGE BALES

(71) Applicant: Bourgault Industries Ltd., St. Brieux (CA)

(72) Inventors: Robert Cochran, Saskatoon (CA); Devin Barros, Saskatoon (CA); Matt Harder, Saskatoon (CA)

(73) Assignee: Bourgault Industries Ltd., St Brieux (CA)

( * ) Notice: Subject to any disclaimer, the term of this patent is extended or adjusted under 35 U.S.C. 154(b) by 0 days.

(21) Appl. No.: 17/966,236

(22) Filed: Oct. 14, 2022

(65) Prior Publication Data

US 2023/0132610 A1    May 4, 2023

(30) Foreign Application Priority Data

Nov. 4, 2021   (CA) ................................ CA 3155378

(51) Int. Cl.
| | |
|---|---|
| *A01D 90/02* | (2006.01) |
| *A01D 90/12* | (2006.01) |
| *A01F 29/00* | (2006.01) |

(52) U.S. Cl.
CPC ............. *A01D 90/02* (2013.01); *A01D 90/12* (2013.01); *A01F 29/005* (2013.01)

(58) Field of Classification Search
CPC .................. B02C 13/286; B02C 23/02; B02C 2013/28618; A01F 29/005; A01F 29/10; A01D 90/083; A01D 87/122; A01D 90/02; A01D 85/005; A01D 87/127; A01D 90/12; A01D 90/08
See application file for complete search history.

(56) References Cited

U.S. PATENT DOCUMENTS

| | | | | |
|---|---|---|---|---|
| 3,620,154 A | * | 11/1971 | Dodgen ................ | A01F 29/005 209/636 |
| 3,782,570 A | * | 1/1974 | Sunderman ........... | A01D 90/08 414/468 |
| 4,019,644 A | * | 4/1977 | Seymour .............. | A01D 90/083 414/491 |
| 4,053,071 A | * | 10/1977 | Schrag .................. | A01F 29/005 241/101.76 |
| 4,248,561 A | * | 2/1981 | Graves ................. | A01D 90/083 414/491 |
| 4,376,607 A | * | 3/1983 | Gibson ................ | A01D 90/083 241/101.76 |
| 4,643,364 A | * | 2/1987 | Lucas .................. | A01D 87/127 241/101.76 |

(Continued)

FOREIGN PATENT DOCUMENTS

| | | | | | |
|---|---|---|---|---|---|
| EP | | 0424192 A1 | * | 4/1991 | .......... A01D 90/083 |
| GB | | 2340436 A | * | 2/2000 | .......... A01D 85/005 |

*Primary Examiner* — Gregory W Adams
(74) *Attorney, Agent, or Firm* — Frost Brown Todd LLP

(57) ABSTRACT

A bale processor and transport apparatus includes a bale processor, and a hitch assembly attached to a rear end of the bale processor. A bale trailer is attached to the hitch assembly, and the bale trailer comprises a trailer conveyor operative to move bales forward on the bale trailer. A lift frame is provided on the bale processor above the hitch, and the lift frame is operative to receive a transported bale from the trailer conveyor and pivot the transported bale upward and forward into a chamber of the bale processor.

24 Claims, 17 Drawing Sheets

(56) References Cited

U.S. PATENT DOCUMENTS

| | | | | |
|---|---|---|---|---|
| 4,657,191 | A * | 4/1987 | Dwyer | A01F 29/005 |
| | | | | 241/282 |
| 5,209,413 | A * | 5/1993 | Dwyer | A01F 29/005 |
| | | | | 241/101.76 |
| 5,255,867 | A * | 10/1993 | Whittleton | A01F 29/005 |
| | | | | 241/101.74 |
| 5,340,259 | A * | 8/1994 | Flaskey | A01D 90/083 |
| | | | | 414/24.5 |
| 5,590,839 | A * | 1/1997 | Condrey | D01B 1/02 |
| | | | | 241/27 |
| 5,590,842 | A * | 1/1997 | Zehr | B02C 13/286 |
| | | | | 241/186.4 |
| 5,842,823 | A * | 12/1998 | Kohnen | A01D 90/083 |
| | | | | 298/22 C |
| 6,764,274 | B2 * | 7/2004 | Maclay | A01D 90/08 |
| | | | | 414/812 |
| 7,004,706 | B1 * | 2/2006 | Wilson | A01D 90/083 |
| | | | | 414/24.5 |
| 8,696,290 | B2 * | 4/2014 | Shoemaker | A01F 25/14 |
| | | | | 414/439 |
| 10,212,890 | B2 * | 2/2019 | Rohrer | A01F 29/12 |
| 10,758,910 | B2 * | 9/2020 | Harrison | B02C 21/02 |
| 11,325,435 | B1 * | 5/2022 | Riddle | B60D 1/322 |
| 2013/0315694 | A1 * | 11/2013 | Kelderman | B60P 1/36 |
| | | | | 414/812 |
| 2019/0350139 | A1 | 11/2019 | Barager et al. | |
| 2019/0380277 | A1 * | 12/2019 | Neudorf | A01F 29/005 |

* cited by examiner

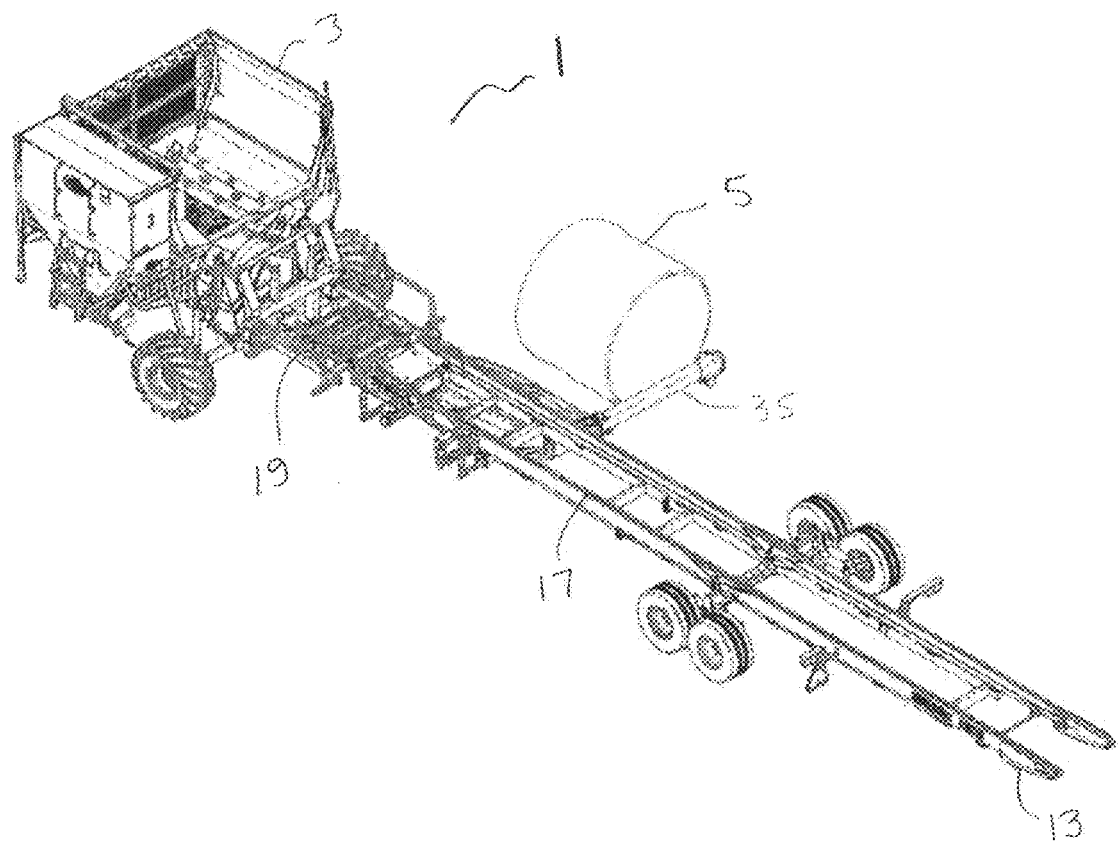
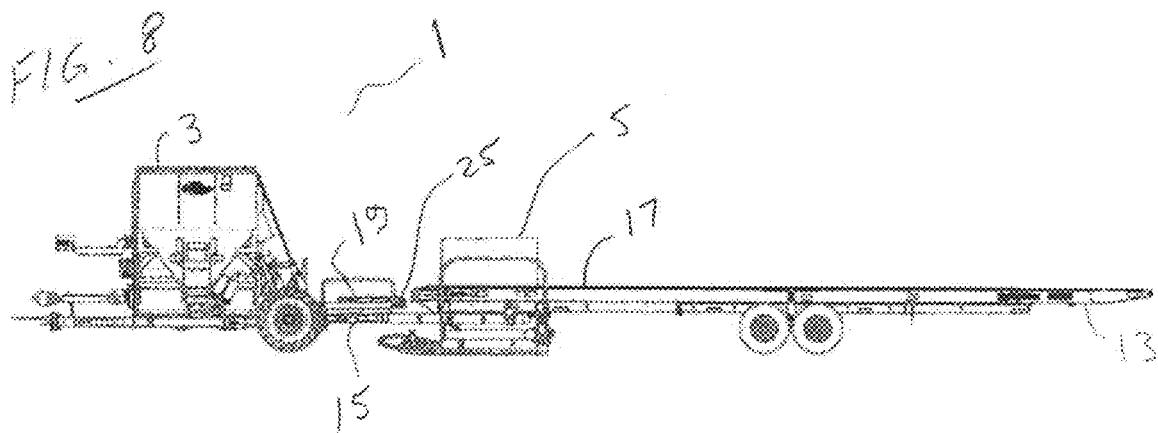

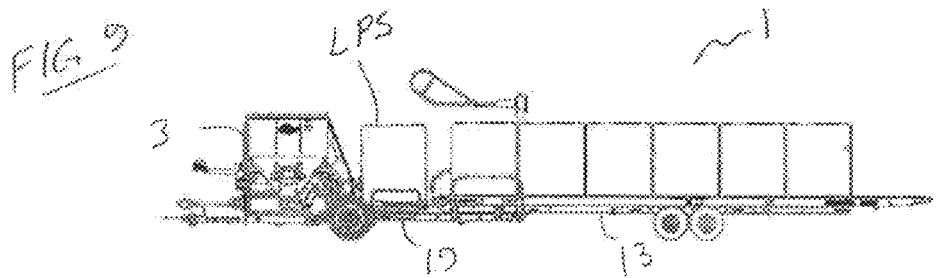
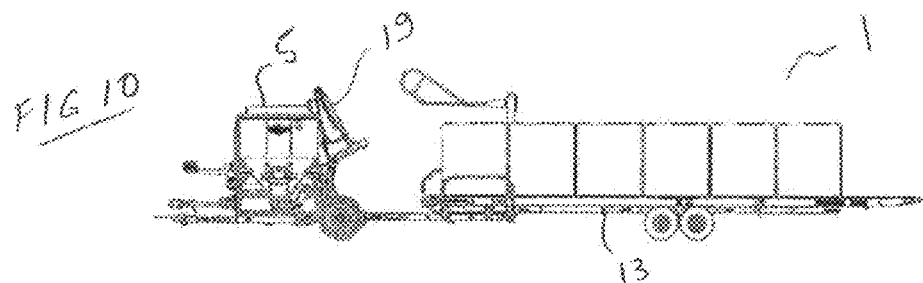
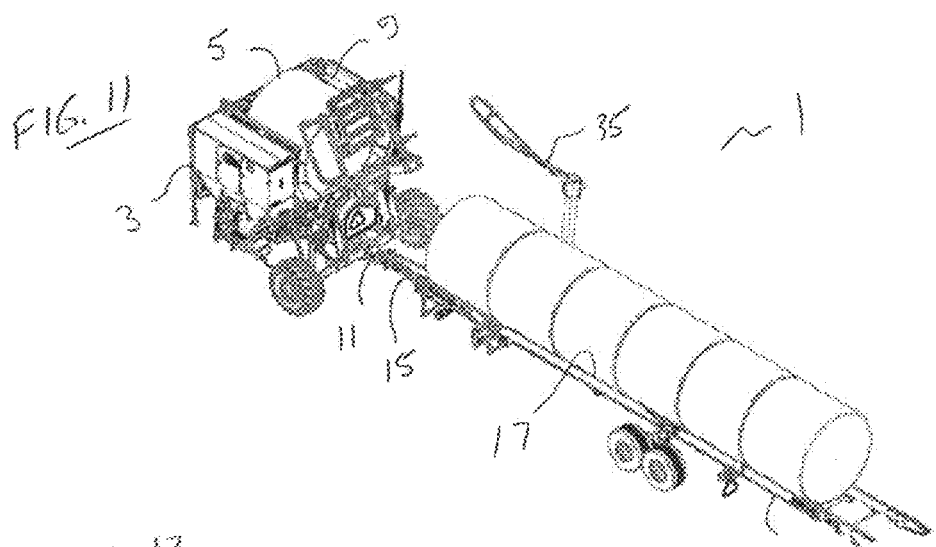
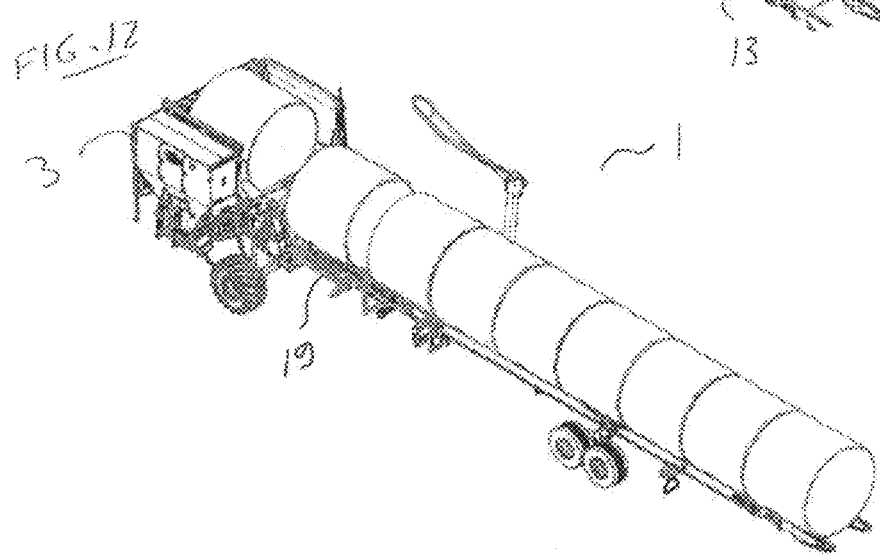

TRANSPORTING AND PROCESSING LARGE BALES

This disclosure relates to the field of agricultural implements for livestock operations and in particular a system for transporting and processing large bales for feeding or bedding.

BACKGROUND

In agricultural livestock operations bale processors are used to process and convert large bales of feed such as hay into windrows of feed that are accessible to cattle. Typically the bales are stored in rows which in some operations are located at a significant distance from the feeding grounds. Also in some operations, the bales may be scattered where the baler dropped them instead of stored in rows.

A typical bale processor can typically only carry two bales to the feeding ground to be processed. United States Published Patent Application Number 2019/0350139 to Barager et al. discloses a bale processor which can carry three bales.

Where the bales must be transported for longer distances it is desirable to carry more bales and so extended carriers are provided by some manufacturers. Bridgeview Manufacturing Inc. of Gerald, Saskatchewan, Canada offers a bale processor with an extended frame behind the bale processor that can carry six bales. The rear end of the frame tilts downward and a conveyor chain moves bales from a stored row onto the frame. A fork behind the bale processor lifts the front bale into the processor, and then another bale is loaded on the frame so that five bales are on the frame and the sixth is in the bale processor.

D&W Industries of Basset, Nebraska, USA offers a similar apparatus with the further option of removing the bale processor and adding a pick up fork to convert the apparatus to a conventional bale trailer, Kramer Manufacturing Inc. of Atkinson, Nebraska, USA also offers a bale processor at the front of a downward tilting extended frame. The apparatus holds six bales and the rear end of the bale processor is open and the bales are fed directly into the bale processor from the extended frame at the rear end.

SUMMARY OF THE INVENTION

The present disclosure provides a bale processor and transport apparatus that overcomes problems in the prior art.

In an aspect, the present disclosure provides a bale processor and transport apparatus. The apparatus includes a bale processor, a hitch assembly attached to a rear end of the bale processor, and a bale trailer attached to the hitch assembly, the bale trailer comprising a trailer conveyor operative to move bales toward a front end of the bale trailer.

In another aspect, a method of processing and transporting large bales is provided. The method includes providing a bale processor with a lift frame attached to a rear end of the bale processor, wherein the bale fork is configured to lift a bale from the ground and deposit the bale into a chamber of the bale processor, attaching a hitch assembly to the rear end of the bale processor, and connecting a bale trailer to the hitch assembly, the bale trailer comprising a trailer conveyor operative to move bales forward on the bale trailer. The lift frame is operative when in an operating position to receive a transported bale from the trailer conveyor and pivot the transported bale upward and forward into a chamber of the bale processor.

The present disclosure thus provides a method and apparatus that combines a bale processor of the prior art and a bale trailer of the prior art into a bale processor and transport apparatus which can carry and process an increased number of bales to a feeding location. When not required for that purpose, the bale trailer can be disconnected and the bale processor and bale trailer can be used conventionally.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 7 is a perspective view of an embodiment of the bale processor and transport apparatus of the present disclosure wherein the bale trailer of FIG. 6 is connected to the hitch assembly mounted on the bale processor of FIGS. 2-5;

FIG. 8 is a side view of the embodiment of FIG. 7;

FIG. 9 is a side view of the embodiment of FIG. 7 with the lift conveyor in the operating position receiving a bale from the trailer conveyor;

FIG. 10 is a side view of the embodiment of FIG. 7 with the lift conveyor raising the bale into the chamber of the bale processor;

FIG. 11 is a perspective rear view of the embodiment of FIG. 7 with the lift conveyor raising the bale into the chamber of the bale processor;

FIG. 12 is a perspective rear view of the embodiment of FIG. 7 filled to capacity with bales;

DETAILED DESCRIPTION OF THE ILLUSTRATED EMBODIMENTS

Figure 1:
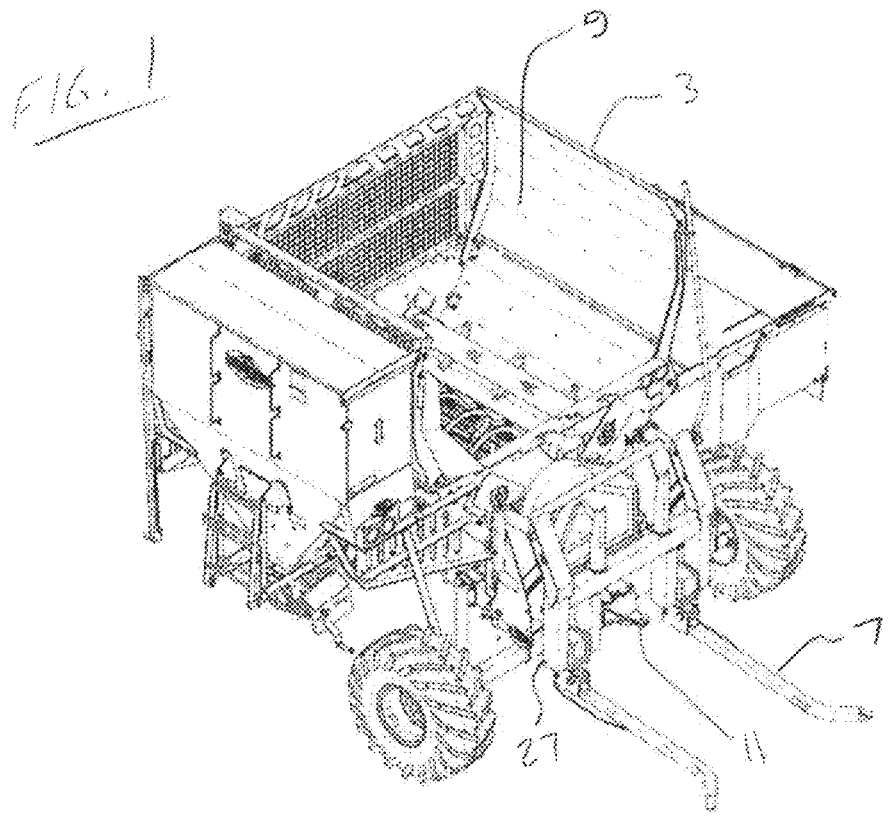
FIG. 1 is a perspective rear view of a conventional bale processor.
Figure 2:
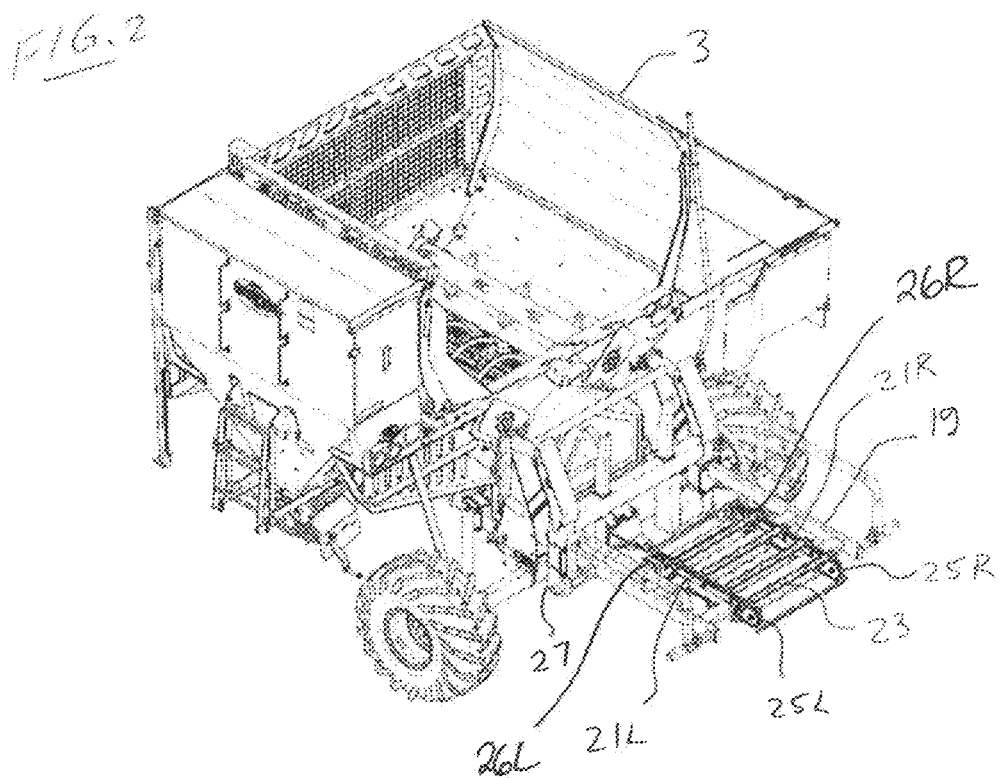
FIG. 2 is a perspective rear view of the bale processor of FIG. 1 with the bale fork removed and with a lift conveyor installed in its place, with the lift conveyor in the operating position.
Figure 3:
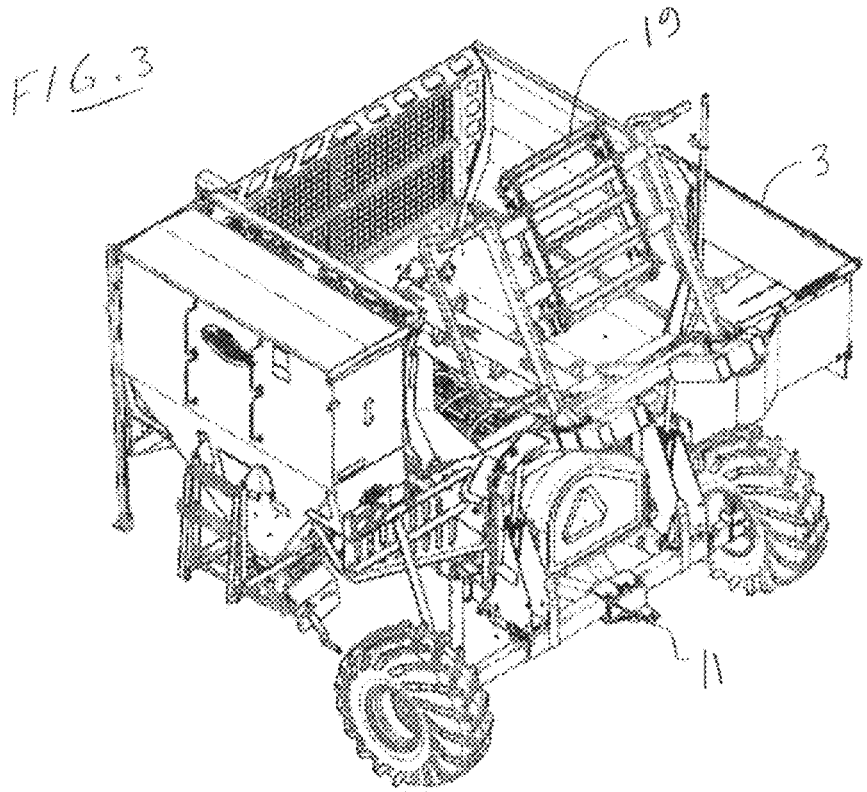
FIG. 3 is a perspective rear view of the bale processor shown in FIG. 2 with the lift conveyor in the raised position.
Figure 4:
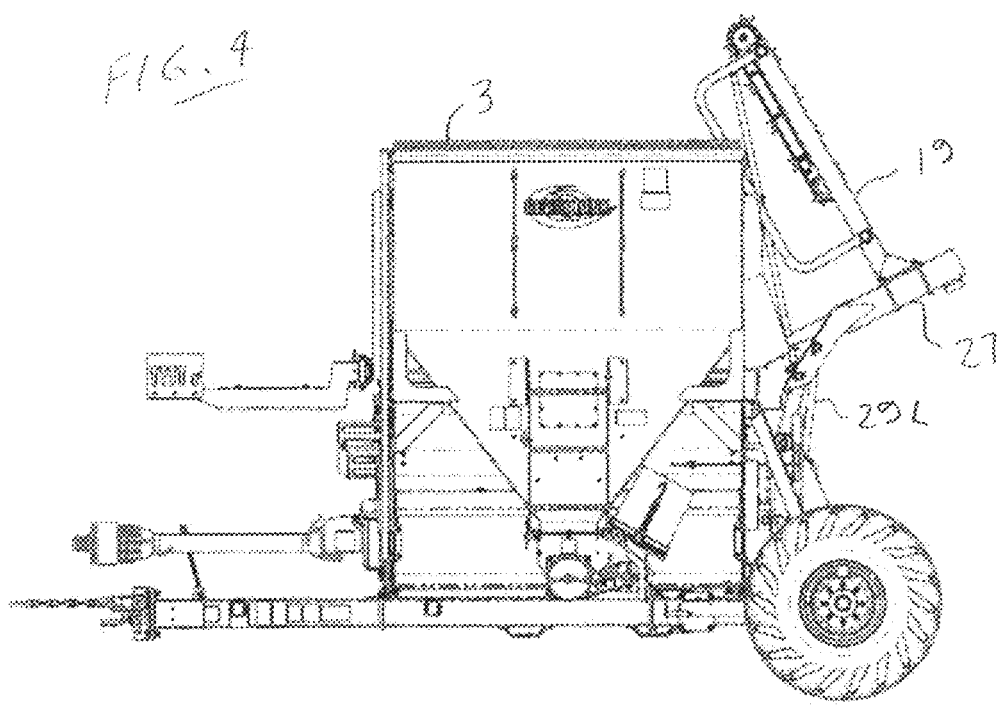
FIG. 4 is a side view of the bale processor shown in FIG. 2 with the lift conveyor in the raised position.
Figure 5:
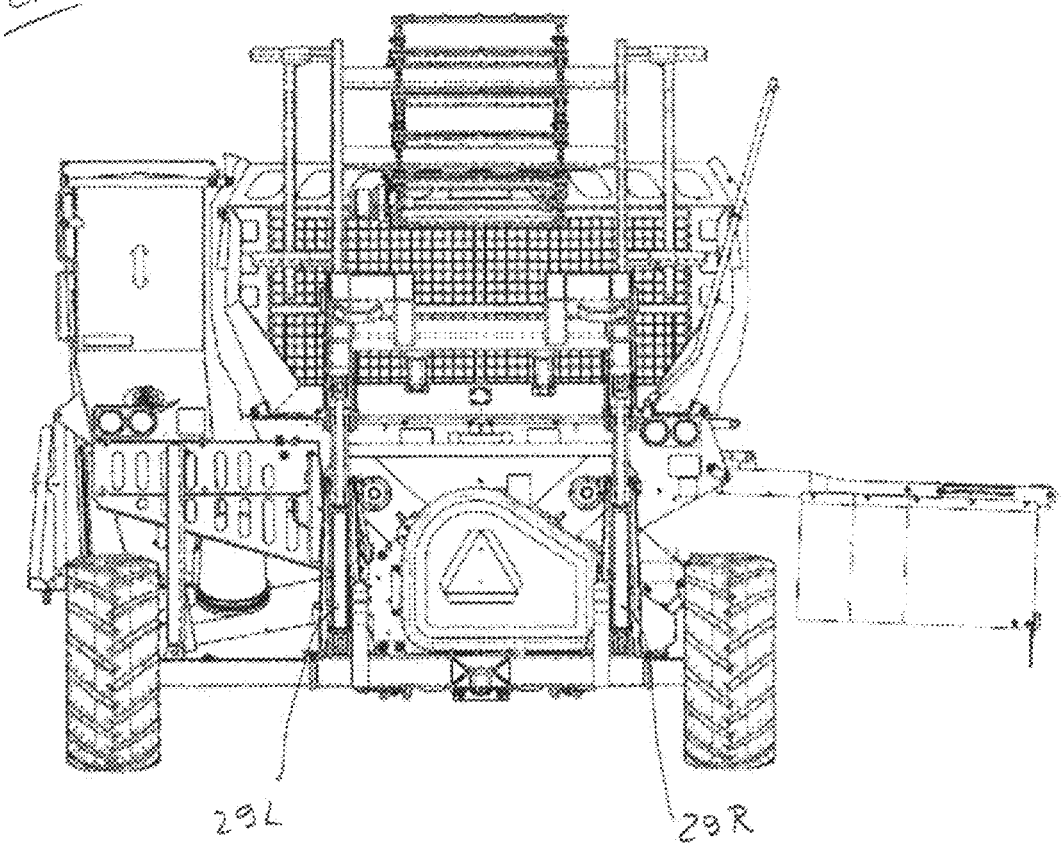
FIG. 5 is a rear view of the bale processor shown in FIG. 2 with the lift conveyor in the raised position.

FIGS. 1-14 illustrate an embodiment of a bale processor and transport apparatus 1 of the present disclosure. The apparatus 1 comprises a bale processor 3, such as is known in the prior art for processing large bales 5. FIG. 1 shows a conventional bale processor 3 with a bale fork 7 that is operative to pick up a bale 5 from the ground and deposit it into the chamber 9 of the bale processor 3. In the illustrated bale processor 3, the bale fork 7 can then pick up another bale 5 and carry that bale 5 in addition to the bale in the chamber 9 of the bale processor 3 such that two bales may be carried to a feeding location. In some operations the feeding location may be at some distance from where the bales 5 are stored and the present disclosure provides an apparatus 1 for transporting and processing a larger number of bales 5. The illustrated bales 5 are cylindrical however large rectangular bales are well known as well and could be used.

A hitch assembly 11 is attached to a rear end of the bale processor 3 and as shown in FIG. 1 the hitch assembly 11 may in many cases simply be left on the bale processor 3 since same does not interfere with the operation of the bale fork 7, or it may be removed.

A conventional bale trailer 13 as is known in the art includes a trailer hitch 15 that is attached to the hitch assembly 11 and comprises a trailer conveyor 17 operative to move bales forward and rearward on the bale trailer 13. The trailer hitch 15 is pivotally attached to the hitch assembly 11 about a vertical pivot axis which provides maneuverability to the apparatus 1 allowing the trailer 13 and bale processor 3 to pivot with respect to each other.

In the apparatus 1, the bale fork 7 can be removed as shown in FIGS. 2-5 and 7-14, and a lift conveyor 19 can be connected to the rear end of the bale processor 3 in place of the bale fork 7 and is positioned above the hitch assembly 11 and the trailer hitch 15. The lift conveyor is movable from an operating position shown in FIG. 2 to a raised position shown in FIG. 3.

The lift conveyor 19 comprises right and left chains 21R, 21L and a plurality of slats 23 extending between the right and left chains 21R, 21L. The lift conveyor 19 is operative, when in an operating position shown in FIGS. 7 and 8 to receive a transported bale 5 from the trailer conveyor 17 and move the transported bale 5 forward to a lift position LPS shown in FIG. 9, and further operative to pivot the transported bale 5 upward and forward into the chamber 9 of the bale processor 3 shown in FIGS. 10 and 11.

The right and left chains 21R, 21L of the lift conveyor 19 are mounted on corresponding right and left rear sprockets 25R, 25L, and right and left front sprockets 26R, 26R. The rear sprockets 25R, 25L are located adjacent to a front end of the trailer conveyor 17 when the lift conveyor 19 is in the operating position shown in FIG. 8.

As described above, the bale fork 7 is configured to lift a bale 5 from the ground and deposit the bale into the chamber 9 of the bale processor 3. The bale fork 7 is releasably attached to a lift frame 27 that is pivotally attached to the rear end of the bale processor and the lift conveyor 19 is also releasably attached to this lift frame 27. Thus the lift conveyor 19 or the bale fork 7 can readily be attached to the lift frame 27, depending on which is needed for the operation contemplated. The lift frame 27 pivots upward and downward in response to the right and left hydraulic cylinders 29R, 29L.

Figure 6:
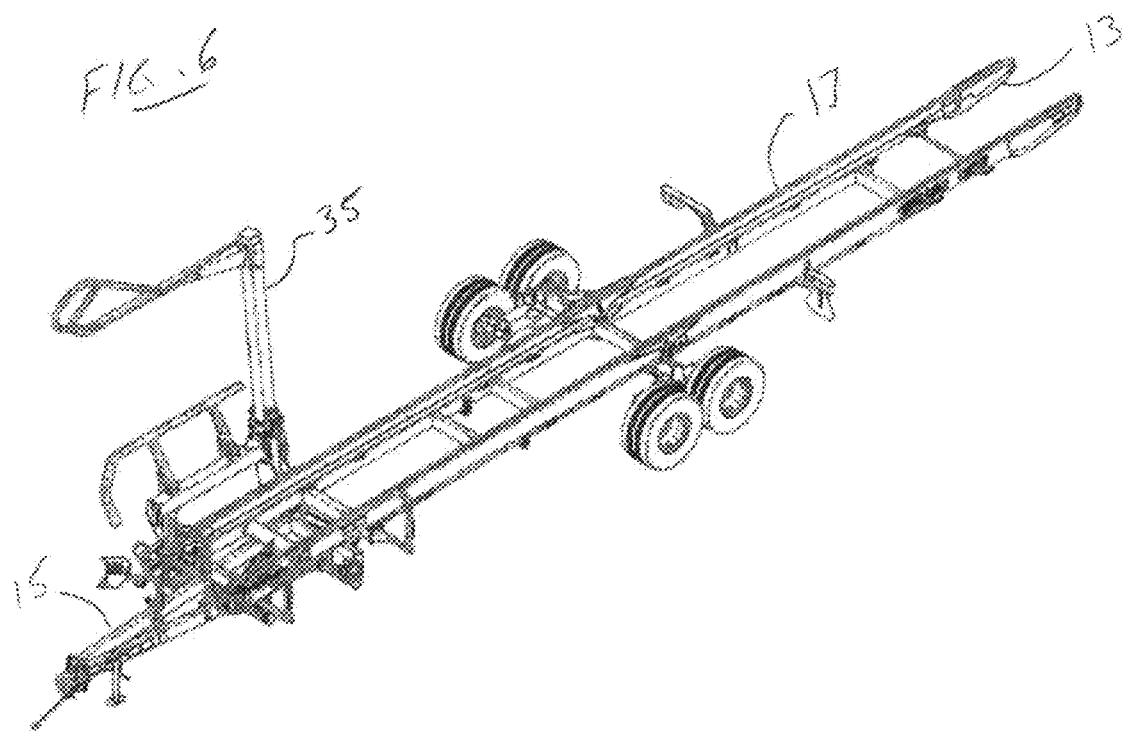
FIG. 6 is a perspective view of a bale trailer.

The bale trailer 13 typically includes a fork arm 35, shown in FIG. 6, operative to pick up bales 5 from the ground as shown in FIG. 7 and deposit the bales on the trailer conveyor 17 where the trailer conveyor 17 moves the bales 5 rearward to make room for the next bale. Thus the apparatus 1 can be used to pick up scattered bales 5 that were dropped by a baler in a field, and transport them to a feeding location.

As illustrated in FIG. 12, by manipulating the apparatus 1 a bale can be placed into the chamber 9 of the bale processor 3, and another can be placed on lift conveyor 19, and the bale trailer 13 can be loaded to capacity. Thus in the illustrated apparatus 1 a total of nine bales 5 may be transported to a distant feeding location for processing.

Figure 13:
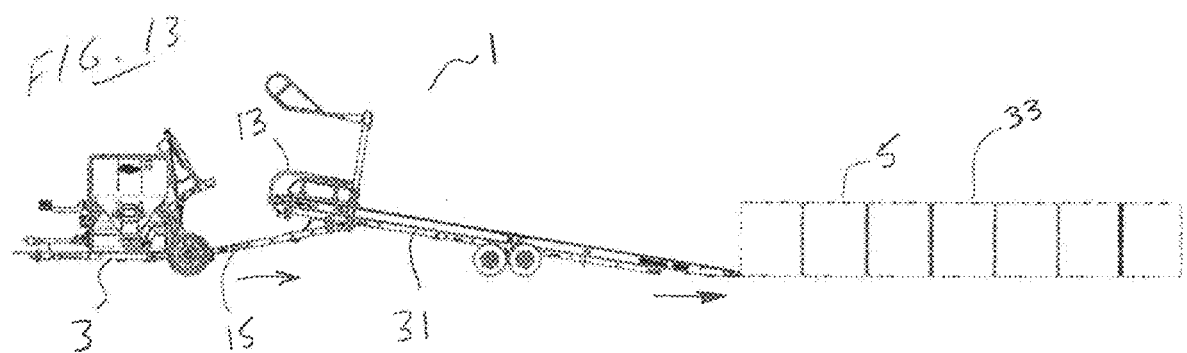
FIG. 13 is a side view of the embodiment of FIG. 7 in position to pick up a row of bales.
Figure 14:
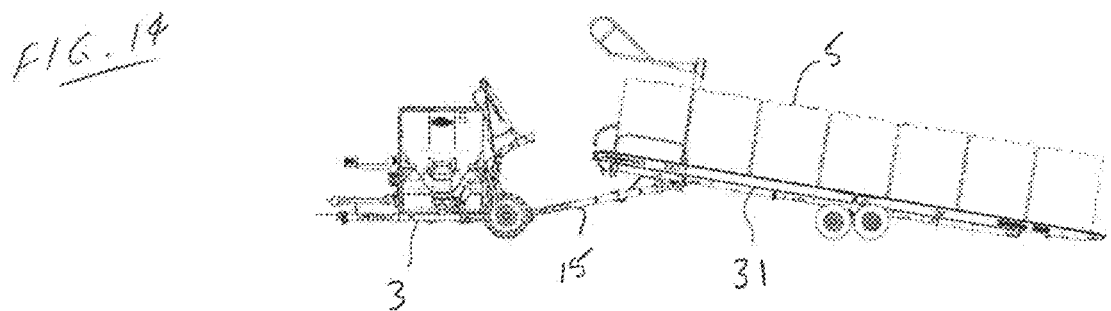
FIG. 14 is a side view of the embodiment of FIG. 7 with the row of bales loaded onto the bale trailer.

A conventional bale trailer 13 as illustrated is typically configured, as shown in FIGS. 13 and 14 to tilt the bed 31 of the bale trailer 13 downward at a rear end of the bed 31 such that a plurality of bales 5 stored in an end to end row 33 can be loaded on the trailer conveyor 17 by moving the bale trailer 13 in reverse and operating the trailer conveyor 17 to move the bales 5 forward. A row 33 of bales can also be picked up by driving alongside the row 33 and using the fork arm 35 to individually load the bales 5 onto the bale trailer 13.

Figure 15:
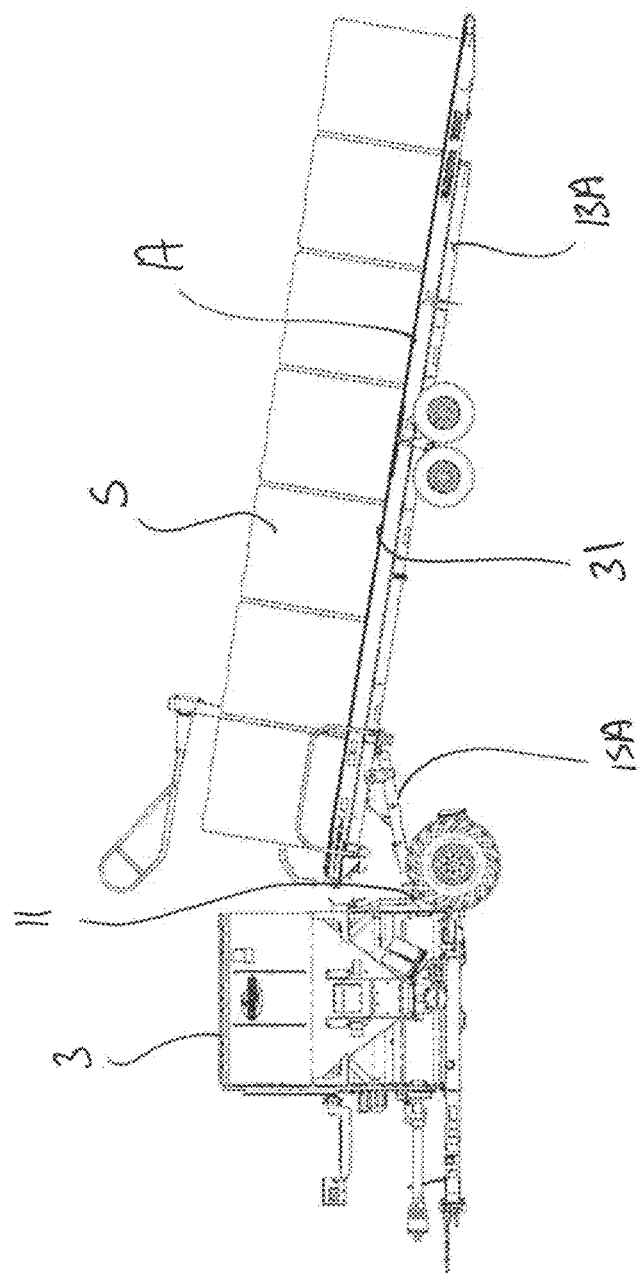
FIG. 15 is a side view an embodiment of a bale processor and a transport apparatus of the present disclosure wherein the bale trailer of FIG. 6 is connected to the hitch assembly mounted on the bale processor of FIGS. 2-5.
Figure 16:
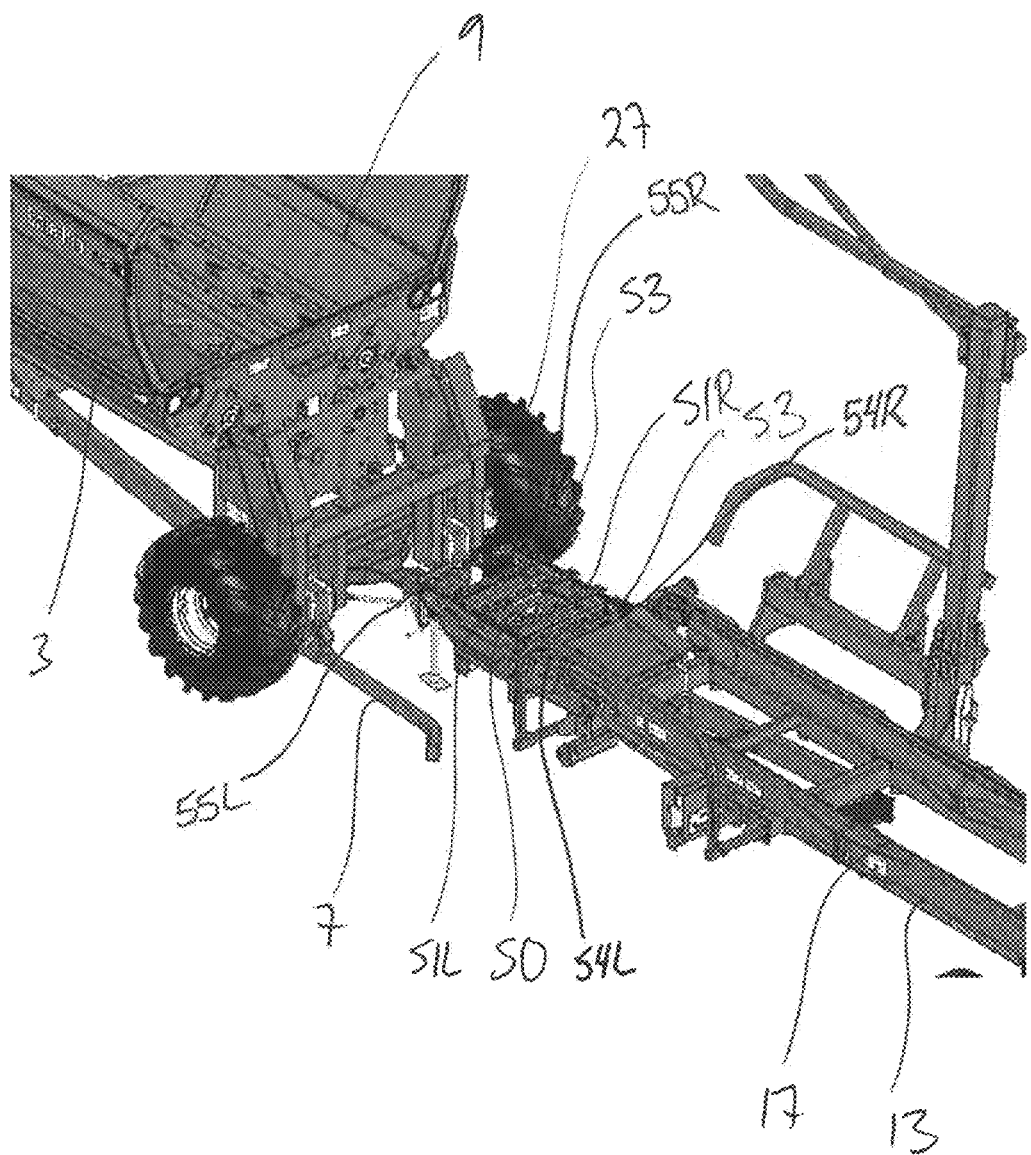
FIG. 16 is a perspective view of a bale processor and a transport apparatus with a transfer conveyor.
Figure 17:
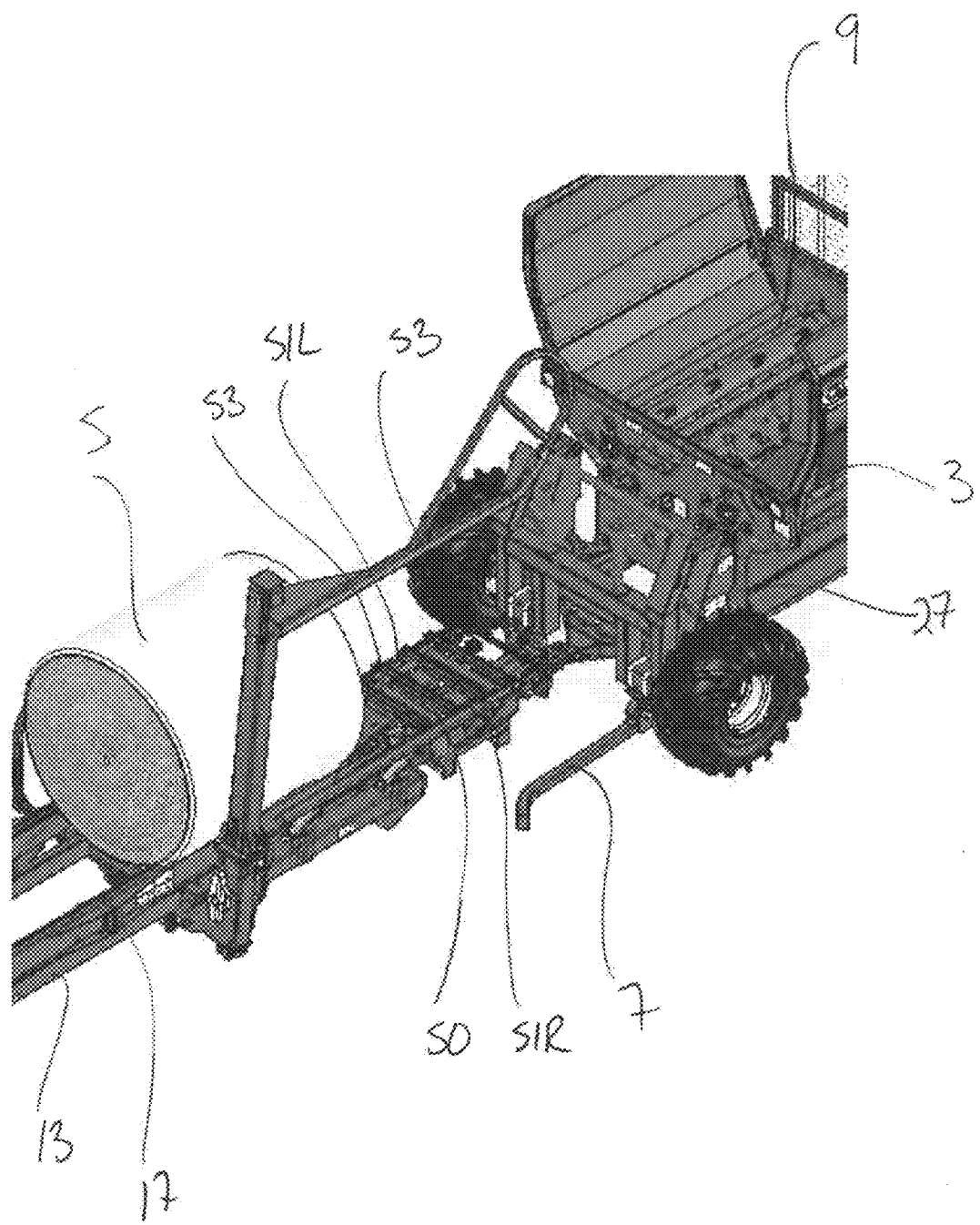
FIG. 17 is a perspective view of the embodiment of FIG. 16 with a bale provided on the transport apparatus.

As illustrated in FIG. 15, bale trailer 13A could also be used with bale processor 3. A bale fork and/or a lift conveyor can be removed from the lift frame 27 and the trailer hitch 15A can be shortened so that the front end of the bale trailer 13A can be positioned closer to the bale processor 3. With the bed 31 tilted so that a front end of the bale trailer 13A is moved upwards, bales 5 on the bed 31 of the bale trailer 13A can then be moved towards the bale processor 3 by the trailer conveyor 17 until the front bale falls off the front end of the bale trailer 13A and into the bale processor 3. In one aspect, the trailer hitch 15A may be telescoping to bring the front end of the bale trailer 13A closer to the bale processor 3.

In another aspect, as shown in FIGS. 16-21, rather than removing the bale fork 7 and attaching a lift conveyor 19 to the lift frame 27, the bale fork 7 can be left attached to the lift frame 27 and a transfer conveyor 50 can be provided on the front of the bale trailer 13 and positioned in front of the trailer conveyor 17 and adjacent to the front of the trailer conveyor 17.

The transfer conveyor 50 can comprise right and left chains 51R, 51L and a plurality of slats 53 extending between the right and left chains 51R, 51L. The right and left chains 51R, 51L of the transfer conveyor 50 are mounted on corresponding right and left rear sprockets 54R, 54L, and right and left front sprockets 55R, 26R. The right and left rear sprockets 54R, 54L are located adjacent to a front end of the trailer conveyor 17.

Figure 18:
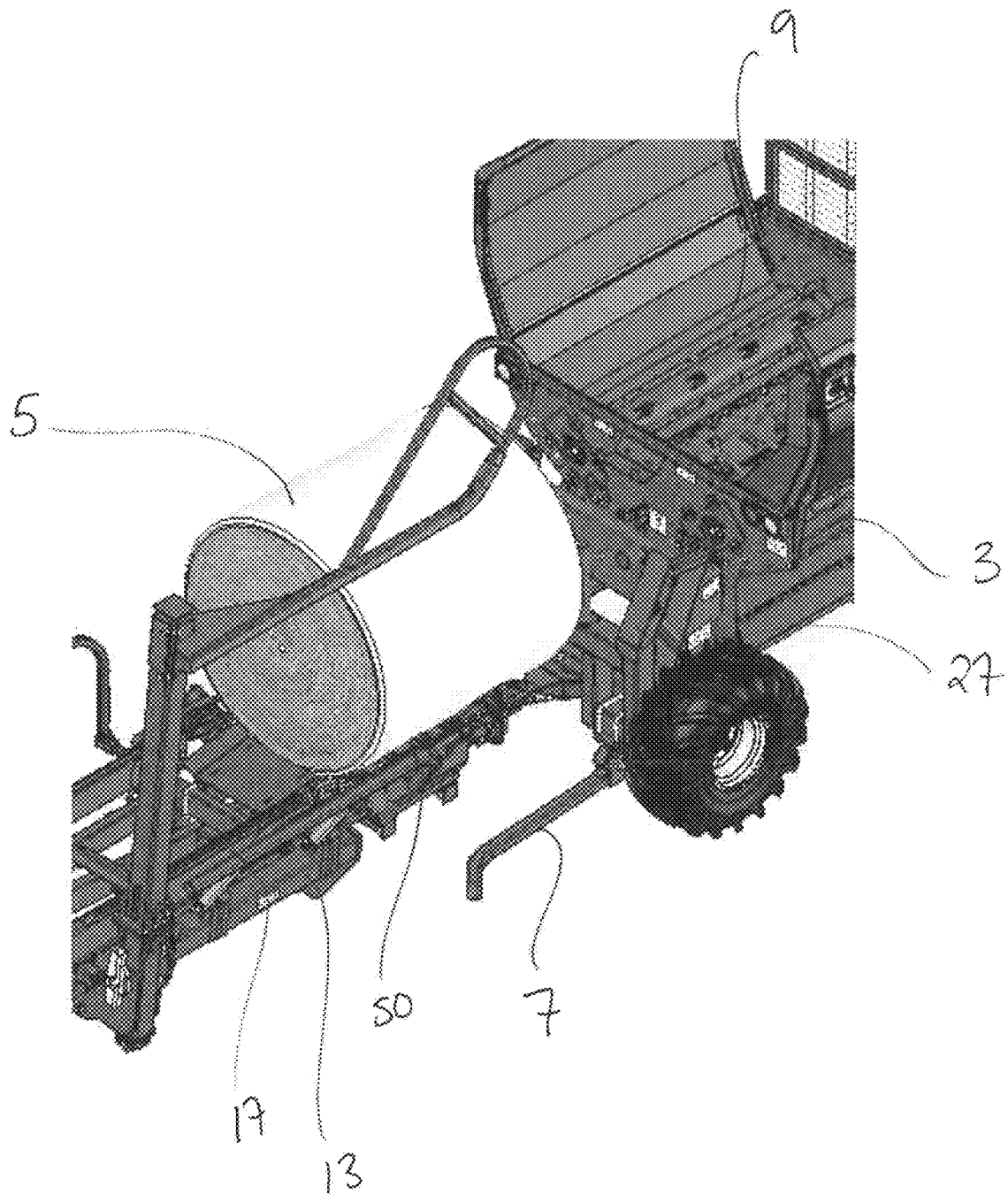
FIG. 18 is a perspective view of the embodiment of FIG. 16 with a bale provided on the transfer conveyor.
Figure 19:
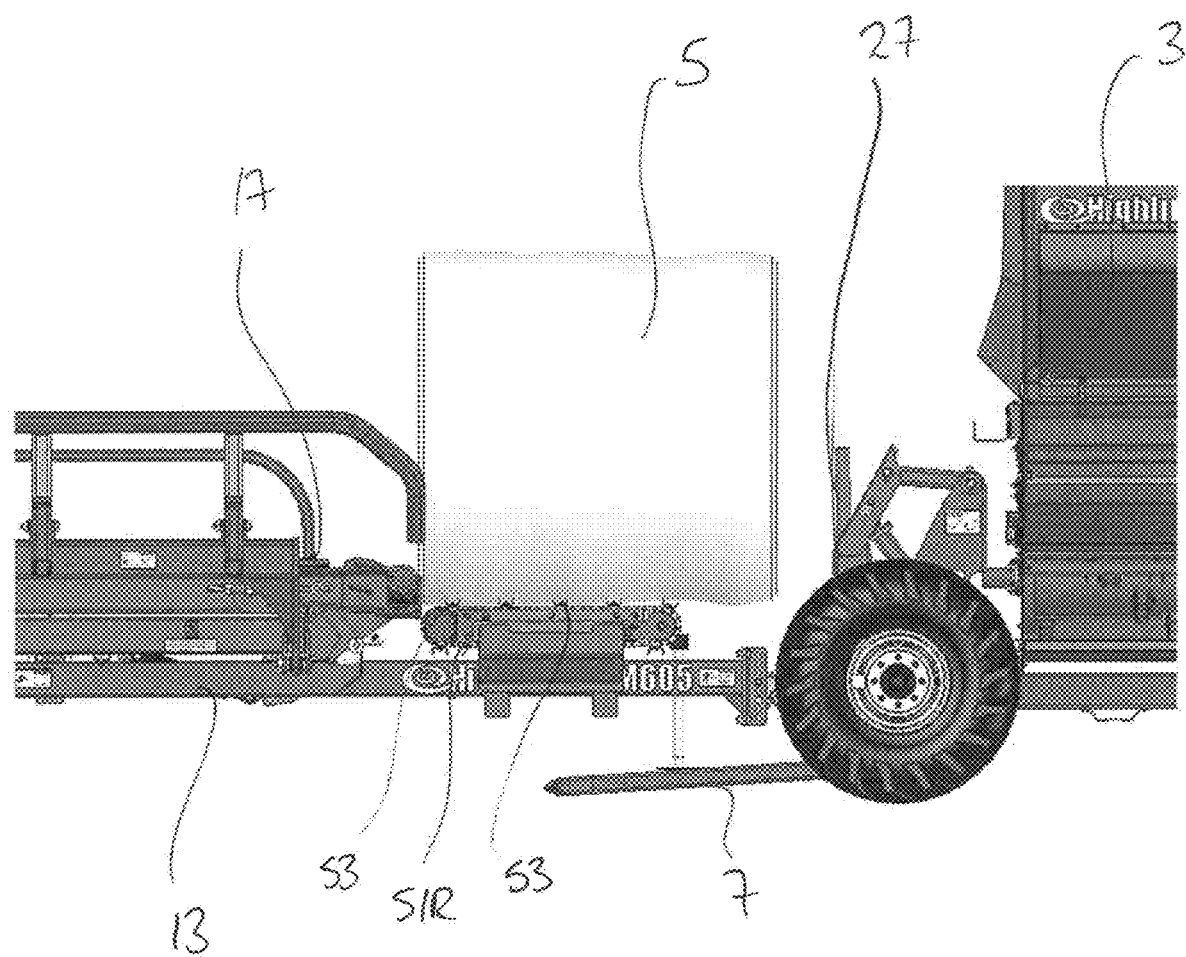
FIG. 19 is a side view of the embodiment of FIG. 16 with a bale provided on the transfer conveyor.
Figure 20:
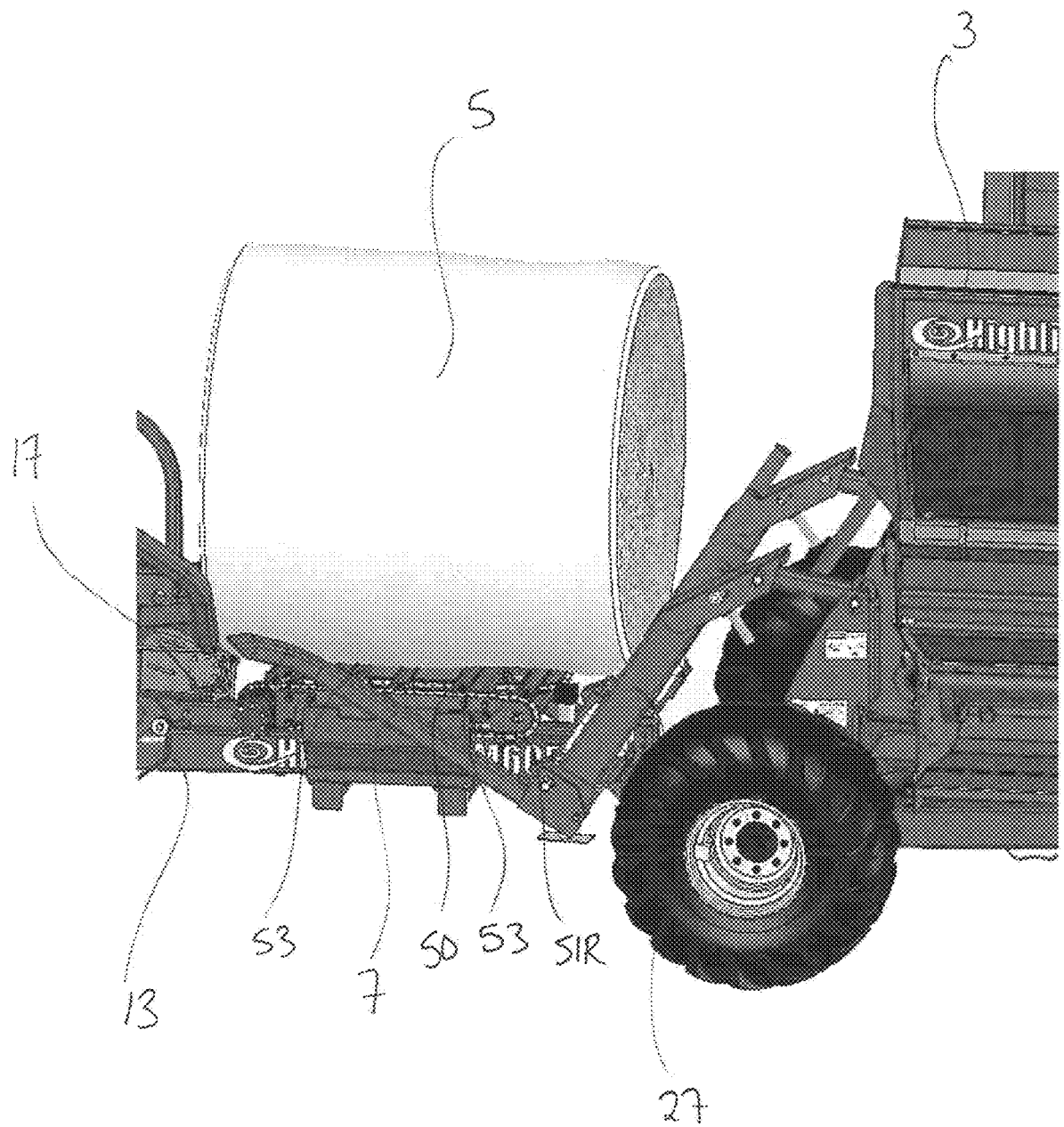
FIG. 20 is a side perspective view of the embodiment of FIG. 16 with a bale provided on the transfer conveyor and a bale fork being moved to come into contact with the bale.

When a bale 5 has been moved to the front of the trailer conveyor 17, as shown in FIG. 20, the trailer conveyor 17 can continue to move the bale 5 off of the front end of the trailer conveyor 17. The transfer conveyor 50 can receive the bale 5 from the trailer conveyor 17 and continue to move the bale 5 towards the rear end of the bale processor 3, as shown in FIGS. 18 and 19.

Figure 21:
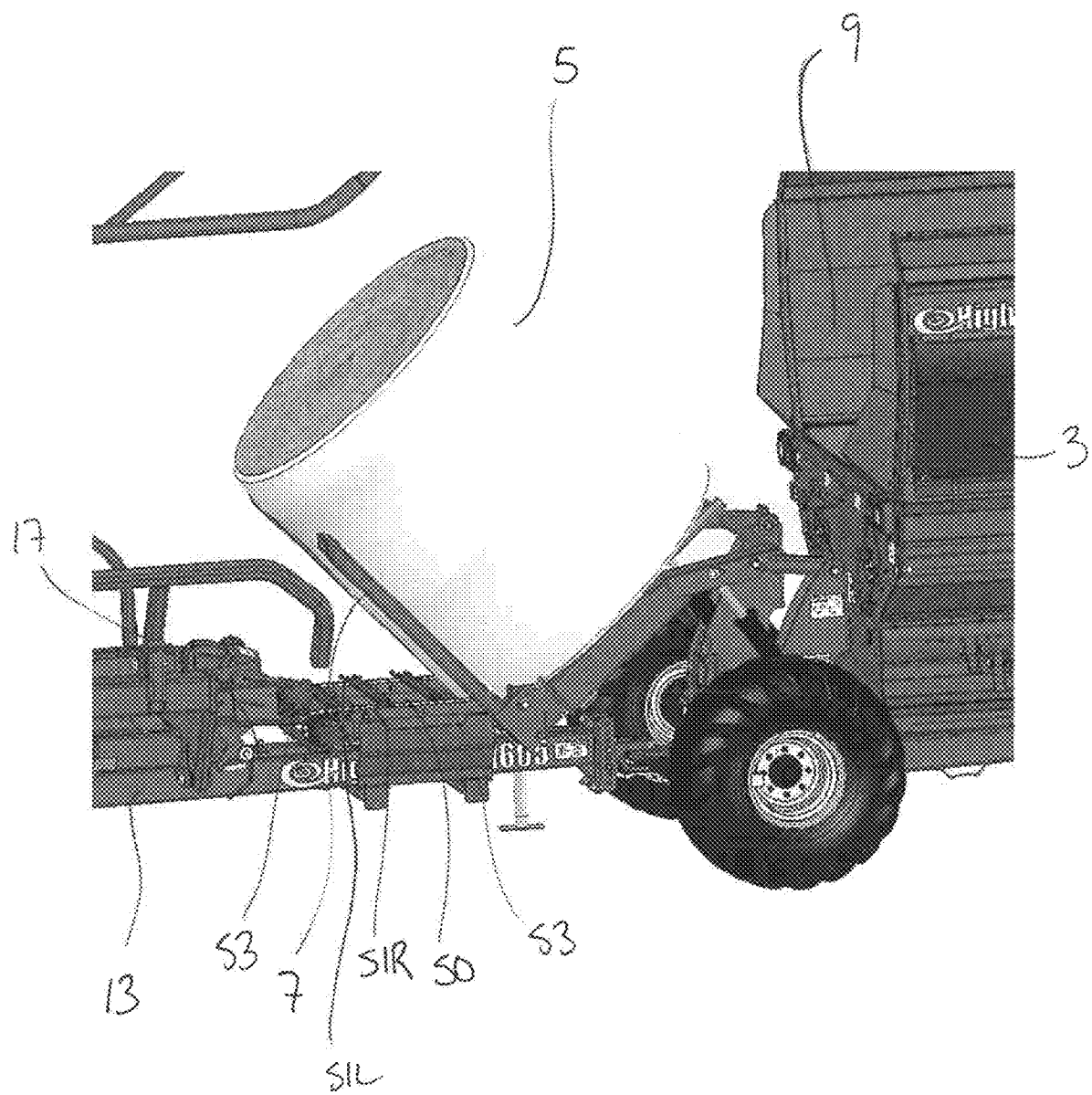
FIG. 21 is a side perspective view of the embodiment of FIG. 16 with a bale being lifted upwards in the bale fork.
Figure 22:
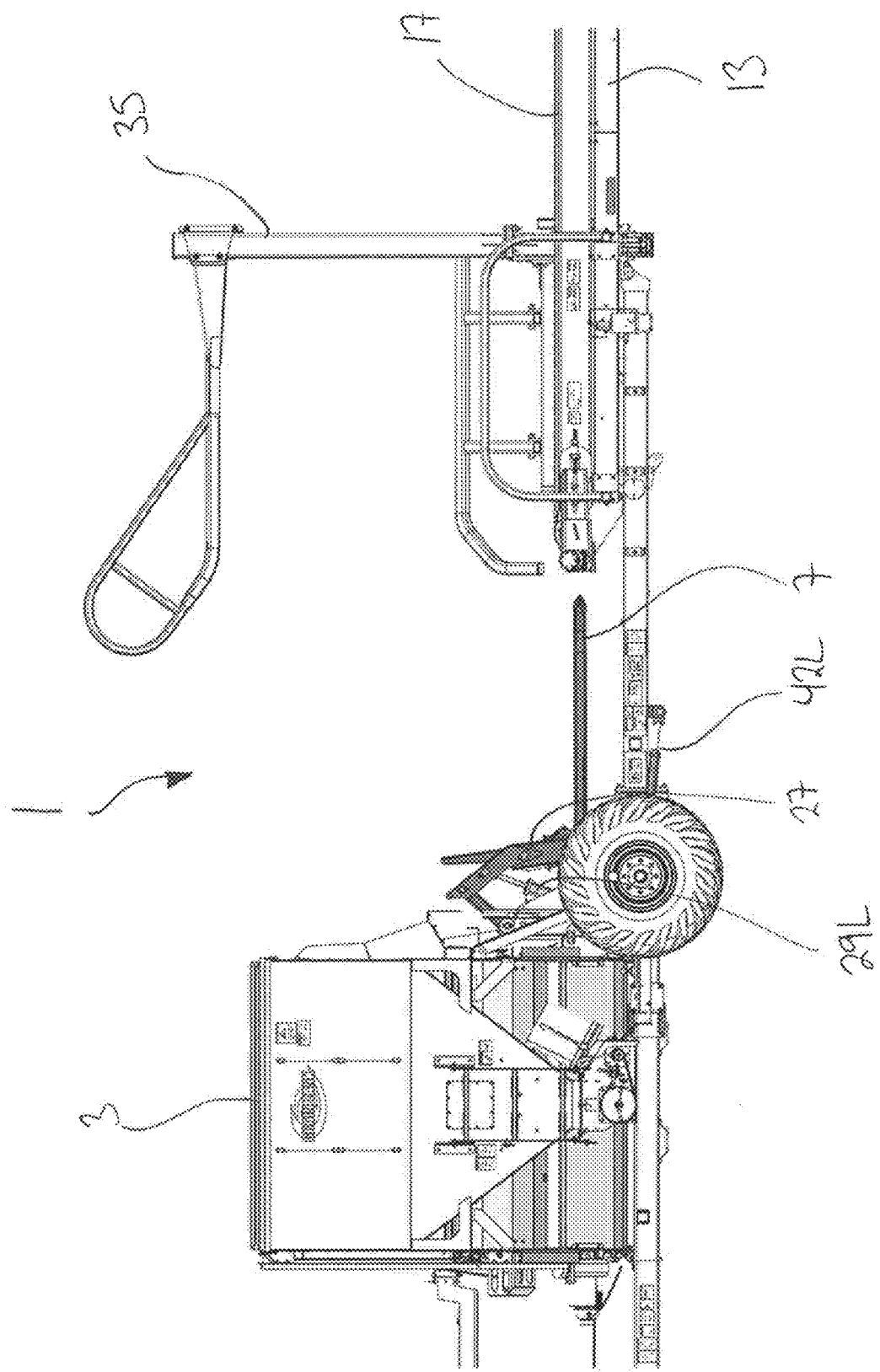
FIG. 22 is a side view of another embodiment of the bale processor and transport apparatus of the present disclosure wherein the bale trailer of FIG. 6 is connected to the hitch assembly mounted on the bale processor of FIG. 1.
Figure 23:
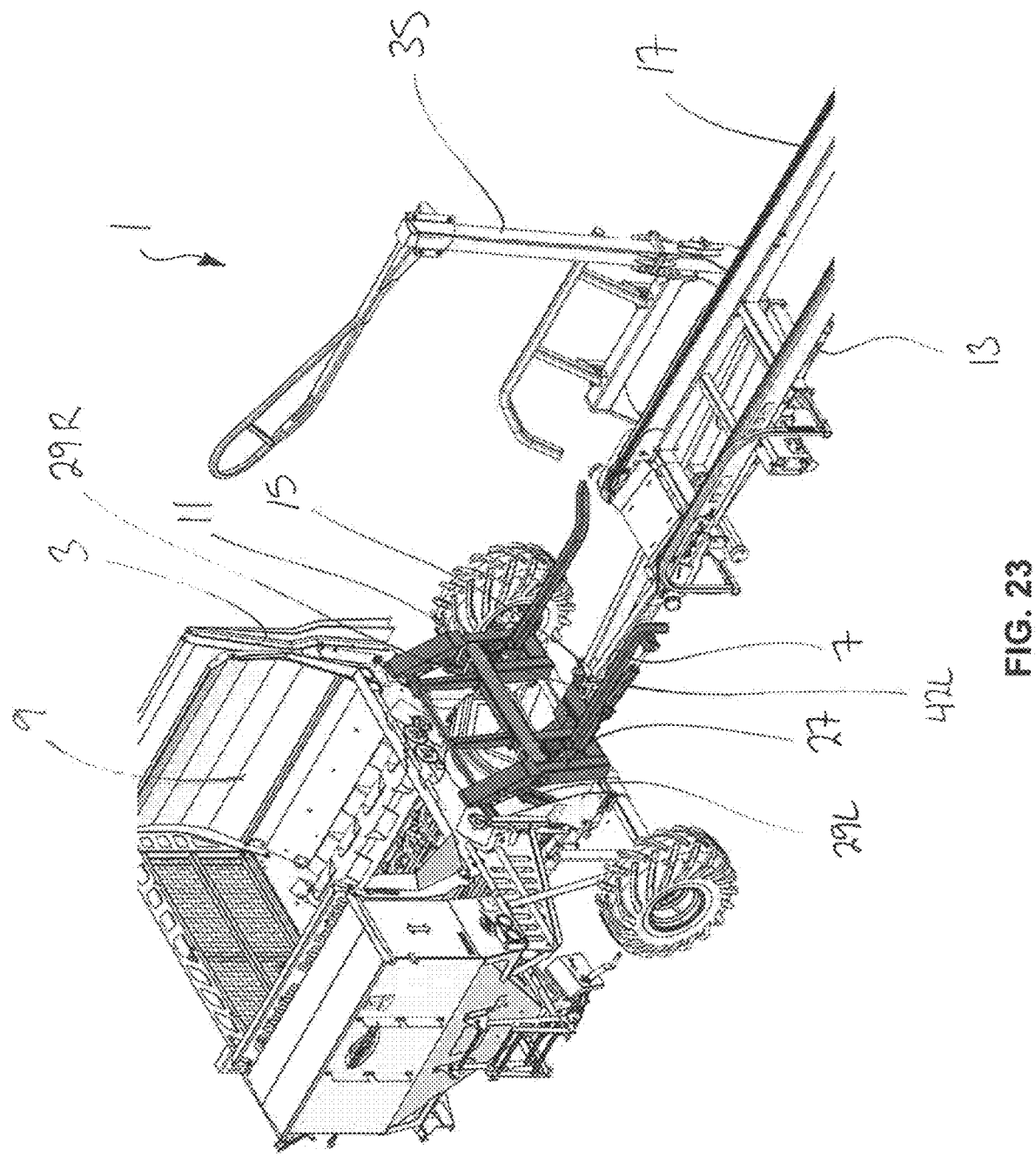
FIG. 23 is a perspective view of the embodiment of FIG. 22.

Once the transfer conveyor 50 has moved the bale 5 close enough to the back end of the bale processor 3 for the bale fork 7 to reach the bale 5, the lift frame 27 can be moved upwards so that bale fork 7 comes into contact with the bale 5, as shown in FIG. 20, and then lifts the bale 5 off of the transfer conveyor 50, as shown in FIG. 21. Continued lifting of the bale 5 in the bale fork 7 will lift the bale 5 upwards and forwards into the chamber 9 of the bale processor 3.

As illustrated in FIGS. 22-25, the bale fork 7 can be left attached to the lift frame 27 when the bale trailer 13 is connected to the rear of the bale processor 3, with the hitch assembly 11 connected to the trailer hitch 15.

In some aspects, the bale fork 7 can be releasably attached higher on the lift frame 27 than it would be when the bale processor 3 is used separately from the bale trailer 13. This higher attachment point of the bale fork 7 allows the bale fork 7 to be positioned above the hitch assembly 11 to prevent the bale fork 7 from coming into contact with the hitch assembly 11 and the trailer hitch 15 and to position the bale fork 7 at a similar level to the trailer conveyor 17 of the bale trailer 13.

The right and left hydraulic cylinders 29R, 29L for lifting the lift frame 27 can also be blocked or stopped from fully retracting so that a bale 5 positioned on the forks 7 can adequately clear the hitch assembly 11 and the trailer hitch 15, especially when travelling over varying terrain or when the bale trailer 13 is angled back, as shown in FIGS. 13-14, to back under a row 33 of bales.

The bale trailer 13 can pick up bales 5 from the ground using the fork arm 35 and deposit the bales on the trailer conveyor 17 where the trailer conveyor 17 moves the bales 5 rearward to make room for the next bale. Thus the apparatus 1 can be used to pick up scattered bales 5 that were dropped by a baler in a field, and transport them to a feeding location.

The trailer conveyor 17 can be used to move a bale forward and onto the lowered bale fork 7 of the bale processor 3. The lift frame 27, the bale fork 7 is attached to, can then be raised to lift the bale and deposit it in the chamber 9 of the bale processor 3. With more than one bale on the bale trailer 13, the bale behind the bale being loaded on the bale fork 7 of the bale processor 3 can be used to push the front bale further onto the bale fork 7 using the trailer conveyor 17.

Figure 25:
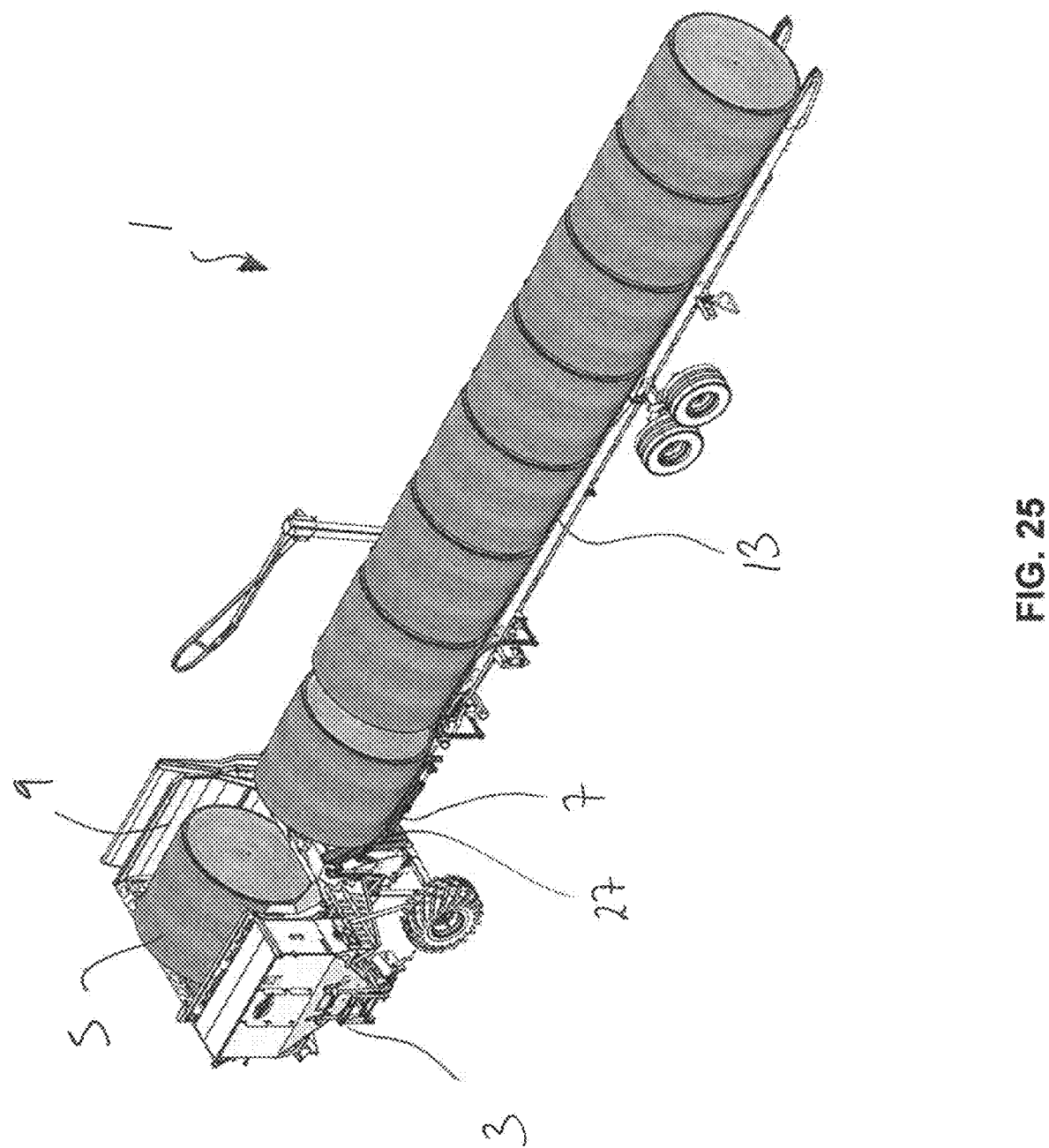
FIG. 25 is a perspective rear view of the embodiment of FIG. 22 filled to capacity with bales.

As illustrated in FIG. 25, by manipulating the apparatus 1 a bale can be placed into the chamber 9 of the bale processor 3, another can be placed on the lift forks 7, and the bale trailer 13 can be loaded to capacity. Thus in the illustrated apparatus 1 a total of nine bales 5 may be transported to a distant feeding location for processing.

The bed 31 of the bale trailer 13 can also be tilted downwards at a rear end of the bed 31 to pick bales up of the ground by moving the bale trailer 13 in reverse and operating the trailer conveyor 16 to move the bales forward on the bale trailer 13.

In a further aspect, a locking mechanism 40 can be provided to allow an operator to selectively "lock" the bale processor 3 relative to the bale trailer 13. The locking mechanism can lock the articulation point between the bale processor 3 and the bale trailer 13 where the hitch assembly 11 of the bale processor 3 is connected to the trailer hitch 15 of the bale trailer 13, preventing the bale trailer 13 from pivoting around the articulation point formed by the trailer hitch 15 connected to the hitch assembly 11.

Figure 24:
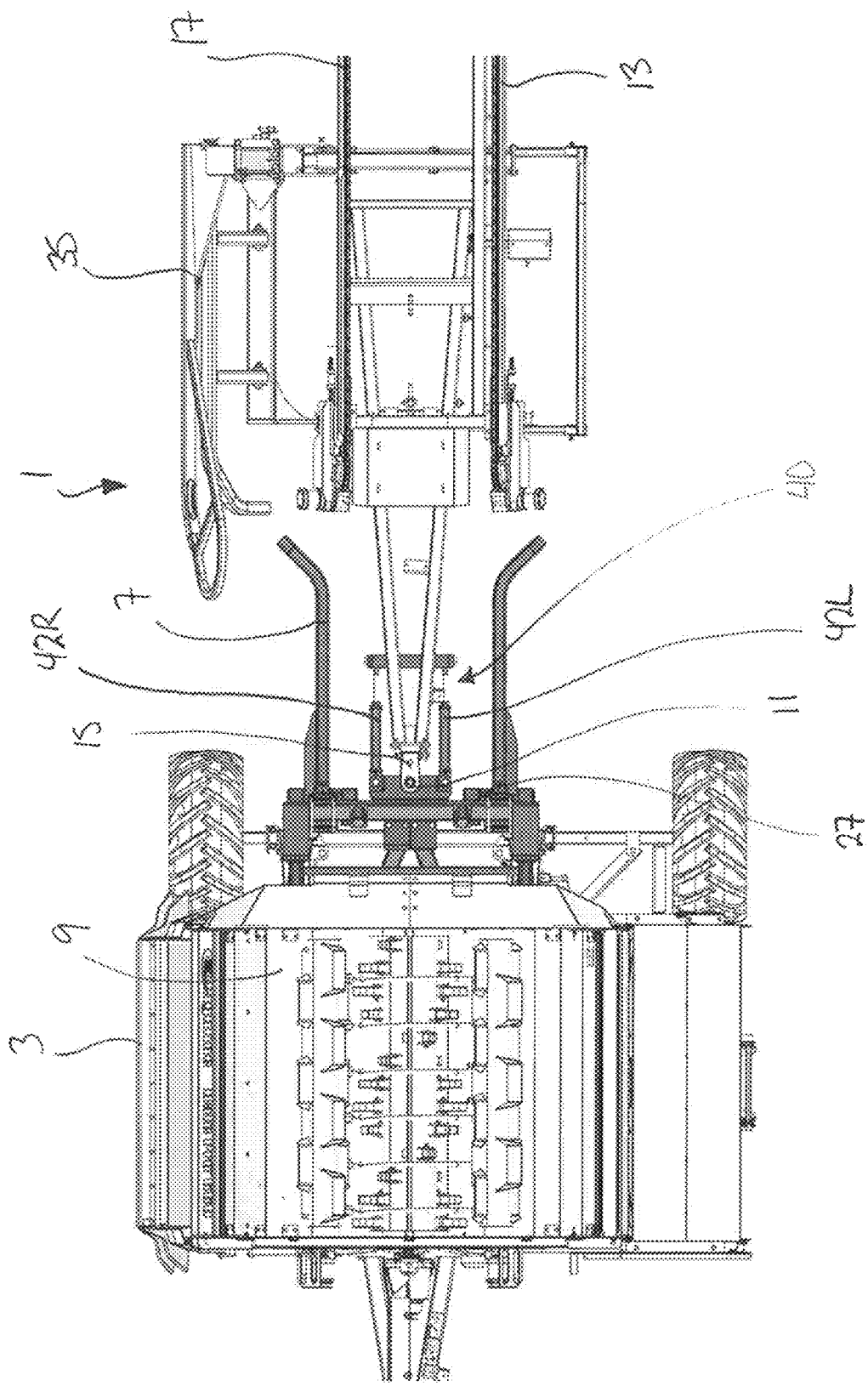
FIG. 24 is a top view of the embodiment of FIG. 22.

Referring to FIG. 24, actuators 42L, 42R, such as hydraulic cylinders, can be connected between the bale processor 3 and the bale trailer 13, with one of the actuators 42L, 42R on either side of the articulation point formed by the hitch assembly 11 and the trailer hitch 15. In normal operation when articulation between the bale processor 3 and the bale trailer 13 is desired, the actuators 42L, 42R can be set to not provide any force or be allowed to "float" if they are hydraulic cylinders. This would allow the actuators 42L, 42R to freely extend and retract as the apparatus 1 is turned, thereby allowing the bale trailer 13 to articulate around the articulation point formed where the trailer hitch 15 of the bale trailer 13 is connected to the hitch assembly 11 of the bale processor 3. This allows for the apparatus 1 to better follow the path of the tow vehicle (such as the tractor). However, when it is desired that the bale processor 3 and the bale trailer 13 be kept straight, the actuators 42L, 42R can be used, i.e. pressure applied if they are hydraulic cylinders, to keep the bale processor 3 and the bale trailer 13 from pivoting around the articulation point formed between the trailer hitch 15 and the hitch assembly 11 and therefore keeping the bale processor 3 and the bale trailer 13 straight. This can make it easier for the apparatus 1 to be backed up, especially when the bed 31 is tilted downwards so that the bale trailer 13 can be backed up under a row of bales.

The present disclosure further provides a method of processing and transporting large bales. The method comprises providing a bale processor 3 with a bale fork 7 releasably attached to a rear end of the bale processor 3, wherein the bale fork 7 is configured to lift a bale 5 from the ground and deposit the bale 5 into a chamber 9 of the bale processor; removing the bale fork 7; attaching a hitch assembly 11 to the rear end of the bale processor 3; releasably attaching a lift conveyor 19 to the rear end of the bale processor 19 above the hitch assembly 11; connecting a bale trailer 13 to the hitch assembly 11, the bale trailer 13 comprising a trailer conveyor 17 operative to move bales forward on the bale trailer 13; wherein the lift conveyor 19 is operative, when in an operating position, to receive a transported bale 5 from the trailer conveyor 17 and move the transported bale forward to a lift position, and further operative to pivot the transported bale 5 upward and forward into a chamber 9 of the bale processor 3.

Thus the present disclosure provides a method and apparatus that provides a lift conveyor 19 to replace the bale fork 7 of a bale processor 3 of the prior art, and a bale trailer 13 of the prior art and combines them into a bale processor and transport apparatus 1 which can carry and process an increased number of bales 5 to a feeding location The apparatus 1 can be converted back into a conventional bale processor 3 and a conventional bale trailer 13 when the apparatus 1 is not required, and can be used conventionally.

In another aspect, the present disclosure further provides a method of processing and transporting large bales where the bale fork 7 is retained and used with the bale trailer 13. The method comprises providing a bale processor 3 with a bale fork 7 attached to the lift frame 27 at a rear end of the bale processor 3, wherein the bale fork 7 is configured to lift a bale 5 from the ground and deposit the bale 5 into a chamber 9 of the bale processor 3; attaching a hitch assembly 11 to the rear end of the bale processor 3; optionally, attaching the bale fork 7 higher on the lift frame 27; connecting a bale trailer 13 to the hitch assembly 11, the bale trailer 13 comprising a trailer conveyor 17 operative to move bales forward on the bale trailer 13; wherein the bale fork 7 is operative, when in an operating position, to receive a transported bale 5 from the trailer conveyor 17 and pivot the transported bale 5 upward and forward into a chamber 9 of the bale processor 3.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A bale processor and transport apparatus comprising:
   a bale processor;
   a hitch assembly attached to a rear end of the bale processor; and
   a bale trailer attached to the hitch assembly, the bale trailer comprising: a trailer conveyor operative to transport bales and move the bales toward a front end of the bale trailer; and,
   wheels supporting the bale trailer above a ground surface, wherein the bale trailer is pivotally attached to the hitch assembly to pivot about a vertical pivot axis.

2. The apparatus of claim 1 further comprising a lift frame pivotally attached to the rear end of the bale processor and wherein:
   a bale fork is configured to lift a bale from the ground and deposit the bale into a chamber of the bale processor, and wherein the bale fork is releasably attached to the lift frame.

3. The apparatus of claim 2 wherein the lift frame pivots upward and downward in response to right and left hydraulic cylinders.

4. The apparatus of claim 1 wherein the hitch assembly is releasably attached to the rear end of the bale processor.

5. The apparatus of claim 1 wherein the bale trailer includes a fork arm operative to pick up bales from the ground and deposit the bales on the trailer conveyor.

6. The apparatus of claim 1 wherein a bed of the bale trailer tilts downward at a rear end of the bed such that a plurality of bales stored in an end to end row can be loaded on the trailer conveyor by moving the bale trailer in reverse and operating the trailer conveyor to move the bales forward.

7. The apparatus of claim 1 further comprising a lift conveyor connected to the rear end of the bale processor above the hitch, the lift conveyor operative when in an operating position to receive a transported bale from the trailer conveyor and move the transported bale forward to a lift position, and further operative to pivot the transported bale upward and forward into a chamber of the bale processor.

8. The apparatus of claim 7 wherein the lift conveyor comprises right and left chains and a plurality of slats extending between the right and left chains.

9. The apparatus of claim 8 wherein the right and left chains are mounted on corresponding front and rear sprockets, and wherein the rear sprockets are located adjacent to a front end of the trailer conveyor when the lift conveyor is in the operating position.

10. The apparatus of claim 7 wherein the lift conveyor is releasably attached to the lift frame.

11. The apparatus of claim 2 wherein the bale fork is releasably attachable at a first position to the lift frame and releasably attachable at a second position to the lift frame, the second position being higher on the lift frame than the first position.

12. The apparatus of claim 1 further comprising a locking mechanism operative to prevent the bale trailer pivoting about the vertical axis where the hitch assembly is attached to the bale processor.

13. The apparatus of claim 12 wherein the locking mechanism comprises at least one actuator connected between the bale processor and the bale trailer.

14. The apparatus of claim 1 further comprising a transfer conveyor provided on the bale trailer in front of the trailer conveyor.

15. A method of transporting and processing large bales comprising:
   providing a bale processor with a lift frame pivotally attached to a rear end of the bale processor, wherein the lift frame is configured to lift a bale from the ground and deposit the bale into a chamber of the bale processor;
   attaching a hitch assembly to the rear end of the bale processor;
   connecting a bale trailer to the hitch assembly, the bale trailer comprising: a trailer conveyor operative to move bales forward on the bale trailer; and, wheels supporting the bale trailer above a ground surface,
   wherein the lift frame is operative when in an operating position to receive a transported bale from the trailer conveyor and pivot the transported bale upward and forward into the chamber of the bale processor.

16. The method of claim 15 further comprising pivotally attaching the bale trailer to the hitch assembly to pivot about a vertical pivot axis.

17. The method of claim 15 further comprising attaching a fork arm to the bale trailer and configuring the fork arm to pick up bales from the ground and deposit the bales on the trailer conveyor.

18. The method of claim 15 comprising;
   maneuvering the bale trailer to a position substantially aligned with a row of stored bales with a rear end of the bale trailer adjacent to the row; and
   tilting a bed of the bale trailer downward at a rear end of the bed and moving the bale trailer in reverse and operating the trailer conveyor to move the bales forward onto the bale trailer.

19. The method of claim 15 further comprising providing a bale fork attached to the lift frame.

20. The method of claim 19 wherein the bale fork is releasably attached to the lift frame and wherein the method further comprises removing the bale fork, releasably attaching a lift conveyor to the lift frame, and using the lift conveyor to receive the transported bale and move the transported bale into the chamber of the bale processor.

21. The method of claim 20 wherein the lift conveyor comprises right and left chains and a plurality of slats extending between the right and left chains.

22. The method of claim 15 wherein the lift frame pivots upward and downward in response to right and left hydraulic cylinders.

23. The method of claim 16 further comprising preventing the bale trailer pivoting about the vertical axis where the hitch assembly is attached to the bale processor when the bale trailer is being backed up.

24. The method of claim 15 further comprising providing a transfer conveyor provided on the bale trailer in front of the trailer conveyor and using the transfer conveyor to move the transported bale towards the bale processor.

* * * * *